(12) United States Patent
Nakamura

(10) Patent No.: US 8,105,723 B2
(45) Date of Patent: *Jan. 31, 2012

(54) REACTION DEVICE, AND FUEL CELL DEVICE AND ELECTRONIC APPARATUS USING THE REACTION DEVICE

(75) Inventor: Osamu Nakamura, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 12/424,459

(22) Filed: Apr. 15, 2009

(65) Prior Publication Data

US 2009/0202875 A1 Aug. 13, 2009

Related U.S. Application Data

(62) Division of application No. 11/811,791, filed on Jun. 12, 2007, now Pat. No. 7,622,208.

(30) Foreign Application Priority Data

Jun. 26, 2006 (JP) .................................. 2006-175152

(51) Int. Cl.
*H01M 8/18* (2006.01)
*B01J 7/00* (2006.01)
*B01J 19/00* (2006.01)

(52) U.S. Cl. ............. 429/419; 429/423; 48/61; 422/198

(58) Field of Classification Search ........... 429/400–535
See application file for complete search history.

(56) References Cited

U.S. PATENT DOCUMENTS

2004/0148858 A1    8/2004   Yamamoto et al.

FOREIGN PATENT DOCUMENTS

| JP | 2004-006265 A | 1/2004 |
| JP | 2005-259354 A | 9/2005 |

*Primary Examiner* — Patrick Ryan
*Assistant Examiner* — Muhammad Siddiquee
(74) *Attorney, Agent, or Firm* — Holtz, Holtz, Goodman & Chick, PC

(57) ABSTRACT

Disclosed is a reaction device including: a reactor, a heat insulating container housing the reactor, a pipe penetrating a wall of the insulating container to connect the reactor to an outside of the insulating container, wherein the wall of the heat insulating container includes at least two regions each having a different infrared absorptivity, and the region of the wall of higher infrared absorptivity is disposed on the same plane of the wall where the pipe penetrates. Also disclosed are a fuel cell device and an electronic apparatus using the reaction device.

10 Claims, 12 Drawing Sheets

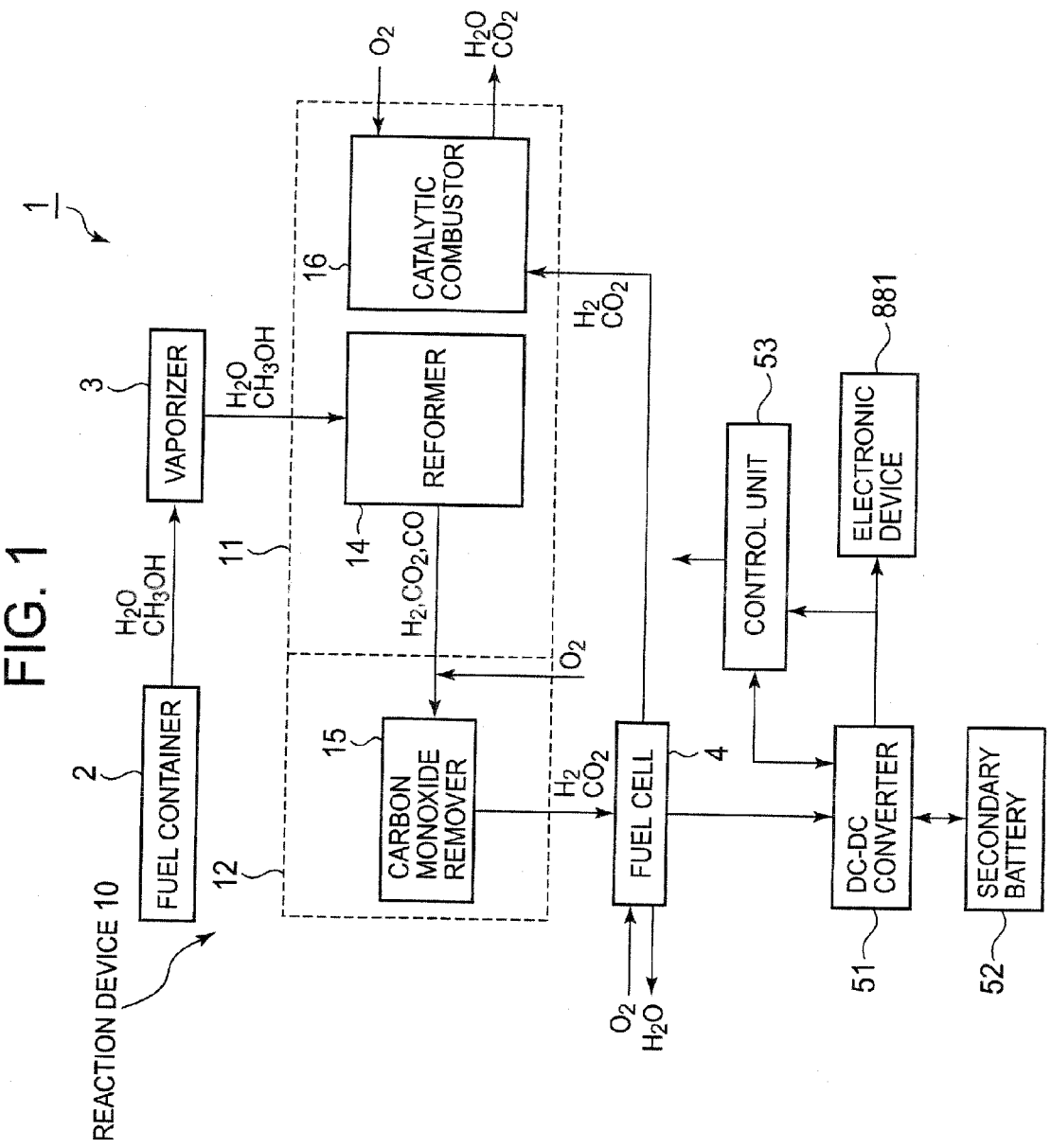

REACTION DEVICE, AND FUEL CELL DEVICE AND ELECTRONIC APPARATUS USING THE REACTION DEVICE

CROSS-REFERENCE TO RELATED APPLICATIONS

The present application is a Divisional Application of U.S. application Ser. No. 11/811,791 filed Jun. 12, 2007 now U.S. Pat. No. 7,622,208 which is incorporated herein by reference.

BACKGROUND OF THE INVENTION

1. Field of the Invention

The present invention relates to a reaction device including reactors such as a reformer, a carbon monoxide remover, which are used for a power generator such as a fuel cell device and the like, require a high operating temperature and are housed in a heat insulating container, a fuel cell device, and an electronic apparatus, the latter two using the reaction device.

2. Description of Related Art

In recent years, a fuel cell using hydrogen as a fuel has begun to be applied to a motorcar, a portable device, and the like as a clean power source having high energy conversion efficiency. The fuel cell is a device for taking out electric energy directly from chemical energy by reacting a fuel and oxygen in the atmosphere electrochemically.

As the fuel used for the fuel cell, hydrogen can be given, but the hydrogen has a problem of its handling and storage because the hydrogen is a gas at an ordinary temperature. If a liquid fuel such as alcohols and gasoline is used, there become needed a vaporizer
vaporizing the liquid fuel, a reformer taking out hydrogen necessary for electric power generation by reacting the liquid fuel and high temperature steam, a carbon monoxide remover removing carbon monoxide, which is a by-product of a reforming reaction, and the like.

Because the operating temperatures of the reformer and the carbon monoxide remover are high, they have been housed in a heat insulating container to suppress heat dissipation. Moreover, a reflection film reflecting infrared rays (having wavelengths of 0.7 µm to 1 mm) has been formed on the inner wall surface of the heat insulating container to reduce the loss of thermal energy to the outside (see, for example, Japanese patent application publication laid-open No. 2004-6265).

Moreover, the intake of the fuel and the discharge of a reformed gas into and from the carbon monoxide remover from and to the outside of the heat insulating container are performed through a pipe connected to the carbon monoxide remover. Accordingly, the junctions of the carbon monoxide remover and a vacuum chamber with the pipe are joined by filling with cement (such as glass frit in case of glass to glass, or a metal or an alloy having a lower melting point in case of metal to metal) (see, for example, Japanese patent application publication laid-open No. 2005-259354).

Now, to the wall of the heat insulating container, where the pipe of the reformer and the carbon monoxide remover penetrates, heat is conducted from the pipe of higher temperature. Consequently, a large temperature difference is caused in the wall of the heat insulating container between the neighborhood of the pipe and the other periphery thereof, and a large thermal stress reduces the strength of the junctions of the pipe.

It is one of objects of the present invention to reduce drastic temperature difference around the penetrated part of the wall by the pipe in order to reduce thermal stress in a reaction device in which a pipe penetrating the wall of a heat insulating container is connected to a reactor inside the container, so as to provide a safe reaction device, a fuel cell device and an electronic apparatus, the latter two using the reaction device.

SUMMARY OF THE INVENTION

According to a first aspect of the present invention, there is provided a reaction device, comprising: a reactor; a heat insulating container housing the reactor; and a pipe penetrating a wall of the heat insulating container to connect the reactor to an outside of the insulating container, wherein the wall of the heat insulating container includes at least two regions each having a different infrared absorptivity, and the pipe penetrates the region of the wall of higher infrared absorptivity.

According to a second aspect of the present invention, there is provided a reaction device, comprising: a reactor; a heat insulating container housing the reactor; and a pipe penetrating a wall of the heat insulating container to connect the reactor to an outside of the insulating container, wherein the wall of the heat insulating container includes at least two regions each having a different infrared absorptivity, and the region of the wall of higher infrared absorptivity and a penetrated portion of the wall by the pipe are located on a same plane of the wall, and are separated from each other.

According to a third aspect of the present invention, there is provided a fuel cell device, comprising: a reactor; a heat insulating container housing the reactor; a pipe penetrating a wall of the heat insulating container to connect the reactor to an outside of the insulating container; and a fuel cell to generate electric power from a reformed gas produced by the reactor by an electrochemical reaction, wherein the wall of the heat insulating container includes at least two regions each having a different infrared absorptivity, and the pipe penetrates the region of the wall of higher infrared absorptivity.

According to a fourth aspect of the present invention, there is provided a fuel cell device, comprising: a reactor; a heat insulating container housing the reactor; a pipe penetrating a wall of the heat insulating container to connect the reactor to an outside of the insulating container; and a fuel cell to generate electric power from a reformed gas produced by the reactor by an electrochemical reaction, wherein the wall of the heat insulating container includes at least two regions each having a different infrared absorptivity, and the region of the wall of higher infrared absorptivity and a penetrated portion of the wall by the pipe are located on a same plane of the wall, and are separated from each other.

According to a fifth aspect of the present invention, there is provided an electronic apparatus, comprising: a reactor; a heat insulating container housing the reactor; a pipe penetrating a wall of the heat insulating container to connect the reactor to an outside of the insulating container; a fuel cell to generate electric power from a reformed gas produced by the reactor by an electrochemical reaction; and an electronic apparatus main body which operates by the electric power generated by the fuel cell, wherein the wall of the heat insulating container includes at least two regions each having a different infrared absorptivity, and the pipe penetrates the region of the wall of higher infrared absorptivity.

According to a sixth aspect of the present invention, there is provided an electronic apparatus, comprising: a reactor; a heat insulating container housing the reactor; a pipe penetrating a wall of the heat insulating container to connect the reactor to an outside of the insulating container; a fuel cell to generate electric power from a reformed gas produced by the reactor by an electrochemical reaction; and an electronic apparatus main body which operates by the electric power generated by the fuel cell, wherein the wall of the heat insulating container includes at least two regions each having a different infrared absorptivity, and the region of the wall of higher infrared absorptivity and a penetrated portion of the wall by the pipe are located on a same plane of the wall, and are separated from each other.

BRIEF DESCRIPTION OF THE DRAWINGS

The above and further objects, features and advantages of the present invention will become more apparent from the following detailed description together with the attached drawings, in which:

FIG. 1 is a block diagram of a fuel cell device 1 to which the present invention is applied;

DETAILED DESCRIPTION OF THE PREFERRED EMBODIMENTS

Figure 2A:
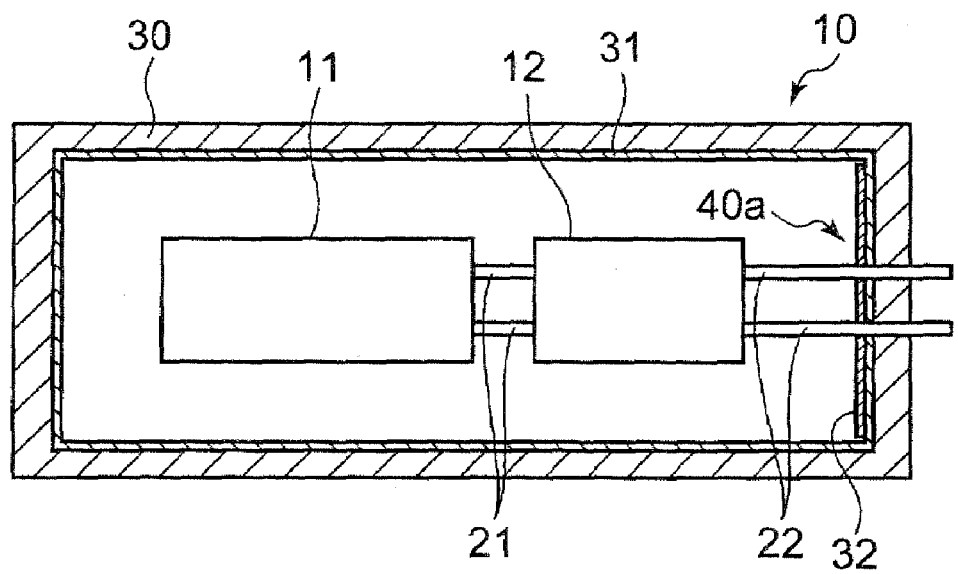
FIG. 2A is a sectional view showing a reaction device 10 of the present invention.

In the following, the preferred embodiments of the present invention will be described with reference to the attached drawings. However, although various limitations that are technically preferable for implementing the present invention are put on the embodiments described below, the scope of the invention is not limited to the embodiments and the shown examples.

First Embodiment

FIG. 1 is a block diagram of a fuel cell device 1, to which the present invention is applied. The fuel cell device 1 is installed in an electronic apparatus such as a lap-top personal computer, a portable telephone, a personal digital assistant (PDA), an electronic personal organizer, a wrist watch, a digital still camera, a digital video camera, game equipment, an amusement machine, and the like, and is used as the power source for operating the electric device main body 881.

The fuel cell device 1 includes a fuel container 2, a vaporizer 3, a reaction device 10, a fuel cell 4, a DC-DC converter 51 converting the electric energy generated by the fuel cell 4 to a suitable voltage, a secondary battery 52 connected to the DC-DC converter 51, and a control unit 53 controlling the above units. The fuel container 2 reserves a fuel such as methanol, ethanol, butane or the like and water in the state of being separated or being mixed, and supplies the vaporized mixed liquid of the fuel and the water to the reaction device 10 with a not shown micro pump after the mixed liquid has been vaporized by the vaporizer 3.

The fuel cell device 1 is detachably installed to the electronic device main body 881. Alternately, the vaporizer 3, the reaction device 10, the fuel cell 4, the DC-DC converter 51, the secondary battery 52, the controller 53 and the like may be built in the electric device main body 881, and only fuel container 2 is detachably installed to the electric device main body 881. In this case, when the fuel container 2 is attached to the electric device main body 881, the fuel and water in the fuel container 2 are supplied to the reaction device 10 by a pump.

The DC-DC converter 51 is configured to be capable of performing the function of charging the secondary battery 52 with the electric energy generated by the fuel cell 4 and supplying the electric energy from the side of the secondary battery 52 to the electric device main body 881 when the side of the fuel cell 4 is not operated besides the function of converting the electric energy generated by the fuel cell 4 into a suitable voltage and then supplying the converted voltage to the electric device main body 881. The control unit 53 controls not shown pumps and valves, which are necessary for operating the reaction device 10 and the fuel cell 4; heaters; the DC-DC converter 51 and the like. The control unit 53 thus performs the control to stably supply electric energy to the electric device main body 881.

Incidentally, the case where methanol is used as the fuel will be described in the following description.

The reaction device 10 includes a high temperature reactor 11 and a low temperature reactor 12; the high temperature reactor 11 includes a reformer 14, a catalytic combustor 16 and a not shown high temperature heater; and the low temperature reactor 12 includes a carbon monoxide remover 15 and a not shown low temperature heater.

The vaporizer 3 vaporizes the fuel and the water that are supplied from the fuel container 2. The reformer 14 reacts the gaseous mixture of the fuel and the water that is supplied from the vaporizer 3 in the way of chemical reaction formulae (1) and (2) to produce a mixture gas of a hydrogen gas and a carbon dioxide gas, which are main products, and a carbon monoxide gas, which is a by-product. The carbon monoxide remover 15 removes the carbon monoxide form the mixture gas by oxidizing the carbon monoxide in the way of a chemical reaction formula (3). In the following, the mixture gas from which the carbon monoxide has been removed is called as a reformed gas. The reformed gas is supplied to the side of the fuel electrode, "anode," of the fuel cell 4.

$$CH_3OH + H_2O \rightarrow 3H_2 + CO_2 \quad (1)$$

$$H_2 + CO_2 \rightarrow H_2O + CO \quad (2)$$

$$2CO + O_2 \rightarrow 2CO_2 \quad (3)$$

The reformed gas is supplied from the carbon monoxide remover 15 to the side of the anode of the fuel cell 4. The hydrogen gas in the reformed gas is separated to hydrogen ions and electrons by a catalyst provided to the anode as shown in an electrochemical reaction formula (4). The hydrogen ions pass through an electrolyte film to move to the side of the oxygen electrode, "cathode," and the electrons move to the cathode via an external circuit. On the side of the cathode, water is produced by a chemical reaction of the hydrogen ions passing through the electrolyte film, the electrons supplied from the cathode via the external circuit, and an oxygen gas supplied from the outside air as shown in an electrochemical reaction formula (5). Electric energy can be taken out owing to the difference of the electrode potential between the anode and the cathode.

$$H_2 \rightarrow 2H^+ + 2e^- \quad (4)$$

$$2H^+ + 2e^- + 1/2O_2 \rightarrow H_2O \quad (5)$$

The hydrogen gas that did not react in accordance with the electrochemical reaction mentioned above and remains as it is (hereinafter referred to as an off-gas) is supplied to the catalytic combustor 16.

The catalytic combustor 16 burns the fuel and the water, that are supplied from the fuel container 2 or the off-gas by intermix oxygen, and heats the high temperature reactor 11 to 250° C. or more, for example about 250° C. to 400° C. The high temperature heater heats the high temperature reactor 11 in place of the catalytic combustor 16 at a starting time, and the low temperature heater heats the low temperature reactor 12 to about 110° C. to 190° C. at a starting time.

The high temperature reactor 11 and the low temperature reactor 12 are housed in a heat insulating container 30, which will be described later. A pipe 21 used as a flow path of reactants and products is provided between the high temperature reactor 11 and the low temperature reactor 12 (see FIGS. 2A and 2B). Moreover, a pipe 22 for flowing in reactants from the outside of the heat insulating container 30 and flowing out products to the outside of the heat insulating container 30 is provided to the low temperature reactor 12 (see FIGS. 2A and 2B).

To put it concretely, the pipe 22 is composed of six pieces (ports) in the configuration of FIG. 1. The six pieces are: an input port for supplying the vaporized fuel from the vaporizer 3, an input port for supplying air ($O_2$) to the carbon monoxide remover 15, an output port for supplying the reformed gas from the carbon monoxide remover 15 to the fuel cell 4, an input port for supplying the off-gas unreacted in the fuel cell 4 to the catalytic combustor 16, an input port for supplying air ($O_2$) into the catalytic combustor 16, and an output port exhausting an exhaust gas from the catalytic combustor 16.

The high temperature reactor 11, the low temperature reactor 12, and the pipes 21 and 22 may be formed by, for example, pasting metal plates made of stainless (SUS 304), Kovar alloy and the like together, or pasting glass substrates and the like together.

Figure 2B:
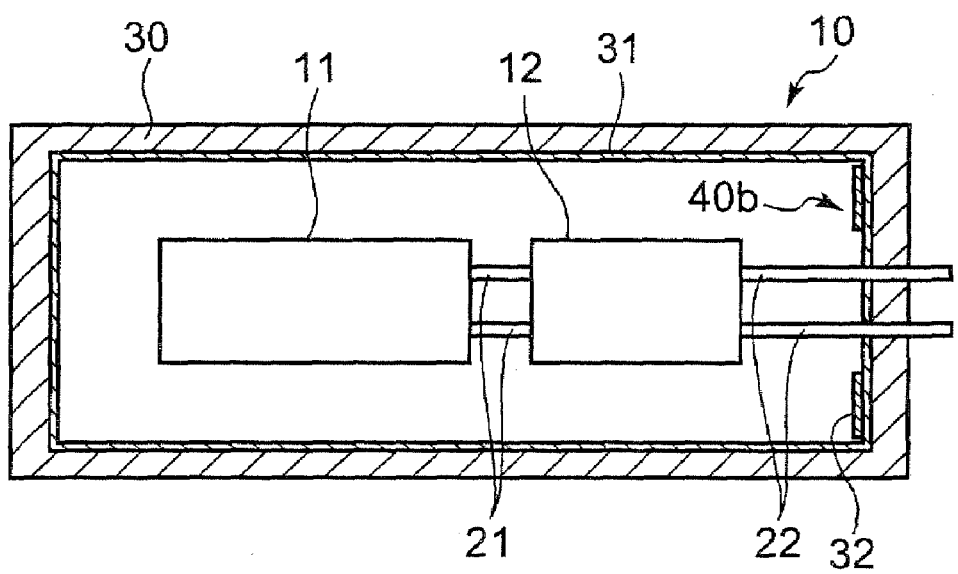
FIG. 2B is a sectional view showing another reaction device 10 of the present invention.

Next, the heat insulating container 30 housing the reaction device 10 will be described. FIGS. 2A and 2B are sectional views of the heat insulating container 30 hosing the reaction device 10. The heat insulating container 30 is shaped in a rectangular parallelepiped, and the high temperature reactor 11 and the low temperature reactor 12 are housed in the inner part thereof. The high temperature reactor 11 and the low temperature reactor 12 are connected with each other with the pipe 21, and the low temperature reactor 12 is fixed with the pipe 22 penetrating the heat insulating container 30.

Incidentally, the joining areas of the pipe 21 with the high temperature reactor 11 and low temperature reactor 12, and the joining areas of the pipe 22 with the low temperature reactor 12 and the heat insulating container 30 are joined by filling up cement in the gaps at the joining areas. As the cement, glass frit can be used when all of the pipes 21 and 22, the high temperature reactor 11, the low temperature reactor 12, and the heat insulating container 30 are made of glass, and a metal or an alloy having a lower melting point can be used when they are made of metal.

The heat insulating container 30 can be formed by pasting together metal plates such as stainless (SUS 304), Kovar alloy and the like, and glass substrates. The reflectivity of these metal plates is mostly 80% or less, and the reflectivity of glass is a low value of about 10%. The internal space of the heat insulating container 30 is kept to be a low pressure (0.03 Pa or less) in order to prevent the heat conduction and the convection of gas molecules.

Moreover, a reflection film 31 reflecting infrared rays is formed on the inner wall surface of the heat insulating container 30 in order to suppress the heat loss caused by the radiation from the reaction device 10. A metal having high reflectivity of infrared rays such as gold (Au) can be used as the reflection film 31. Concrete reflectivity will be described later.

By these measures, the heat loss from the reaction device 10 to the outside of the heat insulating container 30 can be suppressed.

Because a heat quantity is conducted from the reaction device 10 to the heat insulating container 30 by the pipe 22, it is apprehended that a large temperature difference between the temperatures at the penetration portions of the pipe 22 and the temperatures of the periphery arises to operate a large thermal stress if the adiabatic effect of the penetration portion of the pipe 22 is similarly raised to those of the other parts. Accordingly, two or more kinds of regions mutually having different infrared absorptivity are formed on the inner wall surface of the heat insulating container 30 of the present embodiment, and the pipe 22 is arranged to penetrate the region having the highest infrared absorptivity (heat dissipation acceleration portion) among the regions.

The heat dissipation acceleration portion is the region having a higher absorptivity of infrared rays in comparison with the other regions of the inner wall surface of the heat insulating container 30. Steep temperature changes in the vicinity of the wall where the heat dissipation acceleration portion is formed can be suppressed, and a thermal stress can be reduced.

Embodiment A

For example, as shown in FIG. 2A, a heat dissipation acceleration portion 40a can be formed by the further formation of an absorbing film 32 absorbing infrared rays on the inner side of the reflection film 31 provided on the inner wall surface of the heat insulating container 30 where the pipe 22 penetrates the heat insulating container 30. The adiabatic effect can be secured by the reflection film 31, and the steep temperature changes at positions near the joining areas of the pipe 22 where the heat dissipation acceleration portion 40a is formed can be suppressed by the heat dissipation acceleration portion 40a to reduce the thermal stress.

Embodiment B

Moreover, as shown in FIG. 2B, a heat dissipation acceleration portion 40b may be formed by providing the absorbing film 32 not in the neighborhoods of the penetration portions of the pipe 22, but on the wall a little distant from the penetration portions within the same plane of the inner wall where the pipe 22 penetrates. The absorbing film 32 may be provided at two positions so as to sandwich the penetration portions between them, for example, or may be provided so as to enclose the penetration portions.

By disposing the absorbing films 32 in such a way, a heat quantity is conducted from the reaction device 10 to the by the pipe 22, and the infrared rays radiated from the reaction device 10 are absorbed by the absorbing films 32 formed on the wall distant from the penetration portions of the pipe 22 by a little to be transmitted to the heat insulating container 30 as a radiant heat. Consequently, the temperature of the whole wall where the heat dissipation acceleration portions 40b are formed can be more uniformly raised, and the steep temperature changes can be more suppressed. Hence, the thermal stress can be reduced.

In the following, the material, the film thickness and the like of the absorbing film 32 will be examined.

[1] Examination of Reflectivity

First, the reflectivity of a heat dissipation acceleration portion 40 will be examined.

Figure 3:
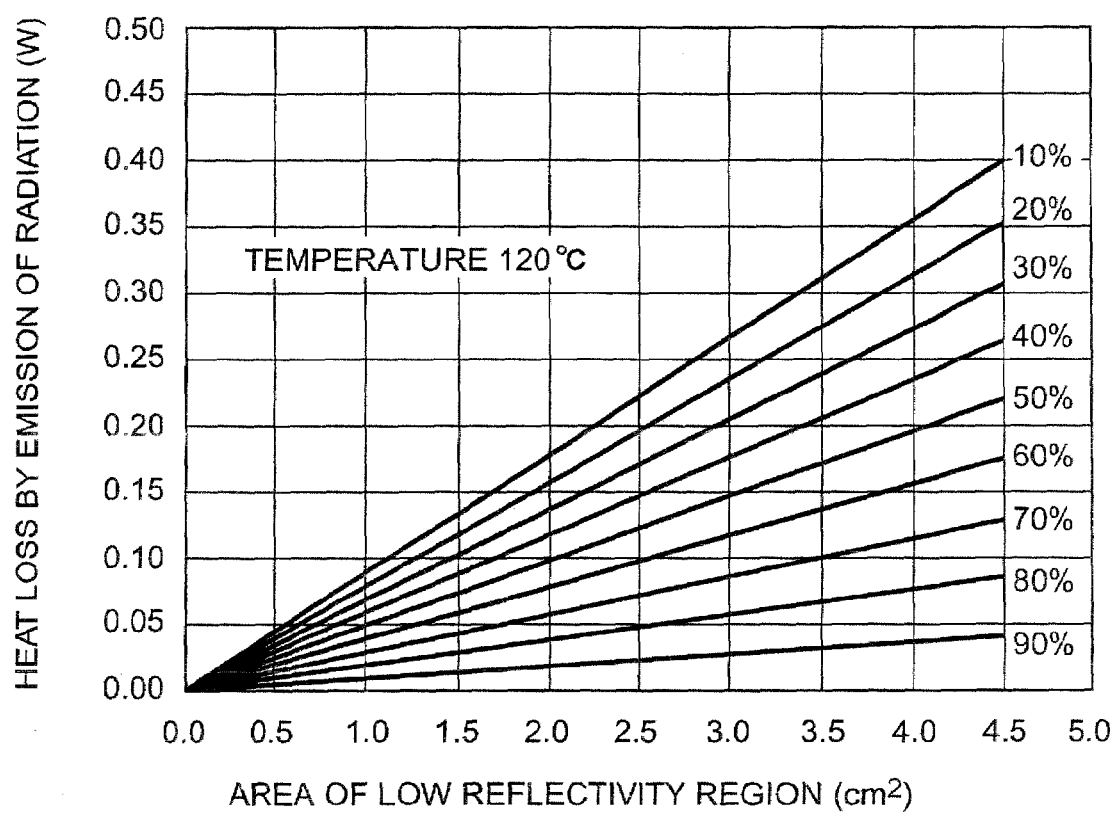
FIG. 3 is a graph showing the relations among the reflectivity, the areas of heat dissipation acceleration portions 40, and heat loss.

FIG. 3 is a graph showing the relations of the areas of the heat dissipation acceleration portion 40 and heat loss (calculated value) (the lines indicating the values at the times of 20% to 90% are calculated based on the values at the time of 10%) in the case of changing the reflectivity of the heat dissipation acceleration portion 40 to infrared rays by 10% within a range of from 10% to 90%. It is supposed here that the absorption coefficient of the absorbing film 32 is sufficiently large, and that there are no infrared rays that transmit the absorbing film 32, are reflected by an undercoat or the reflection film 31, again transmit the absorbing film 32, and then return to the inside of the heat insulating container 30.

Incidentally, it is also supposed that the size of the low temperature reactor 12 is 1.0 cm×2.5 cm×0.3 cm, and that the distance between the low temperature reactor 12 and the heat insulating container 30 is 0.5 cm. Moreover, it is further supposed that both of the thermal inflow from the pipe 21 and the thermal outflow from the pipe 22 are 0.90 W, and that the initial temperature of the low temperature reactor 12 is 120° C.

For example, if the reflectivity of the heat dissipation acceleration portion 40 is 10%, and if the area of the heat dissipation acceleration portion 40 is 4.0 cm², then the heat loss is about 0.35 W, and it is known that the temperature of the low temperature reactor 12 lowers by about 40° C. to be about 80° C.

[2] Examinations of Absorption Coefficient and Film Thickness

Next, the absorption coefficient and the film thickness of the absorbing film 32 to be used for the heat dissipation acceleration portion 40 will be examined.

Figure 4:
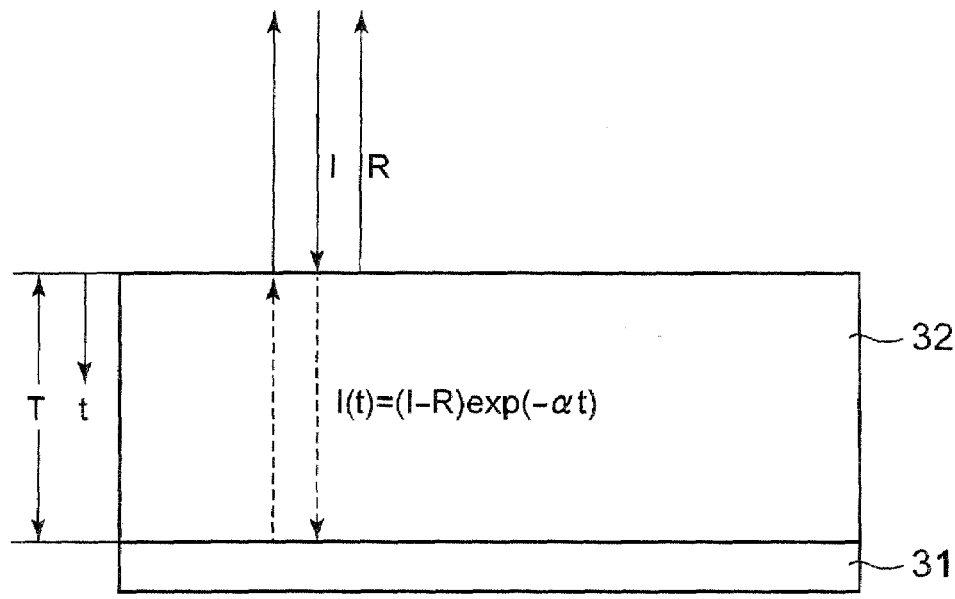
FIG. 4 is a schematic view showing the relations infrared rays that enter, are reflected by, and transmit an absorbing film 32.

As shown in FIG. 4, if the strength of an infrared ray entering the absorbing film 32 is denoted by I; if the strength of the infrared ray reflecting on the surface of the absorbing film 32 is denoted by R; if the absorption coefficient of the absorbing film 32 is denoted by α; and if the distance (depth) from the surface of the absorbing film 32 is dented by t, then the strength I(t) of the infrared ray transmitting the absorbing film 32 at the position of the distance (depth) t can be expressed by the following formula.

$$I(t)=(I-R)\exp(-\alpha t)$$

Figure 5:
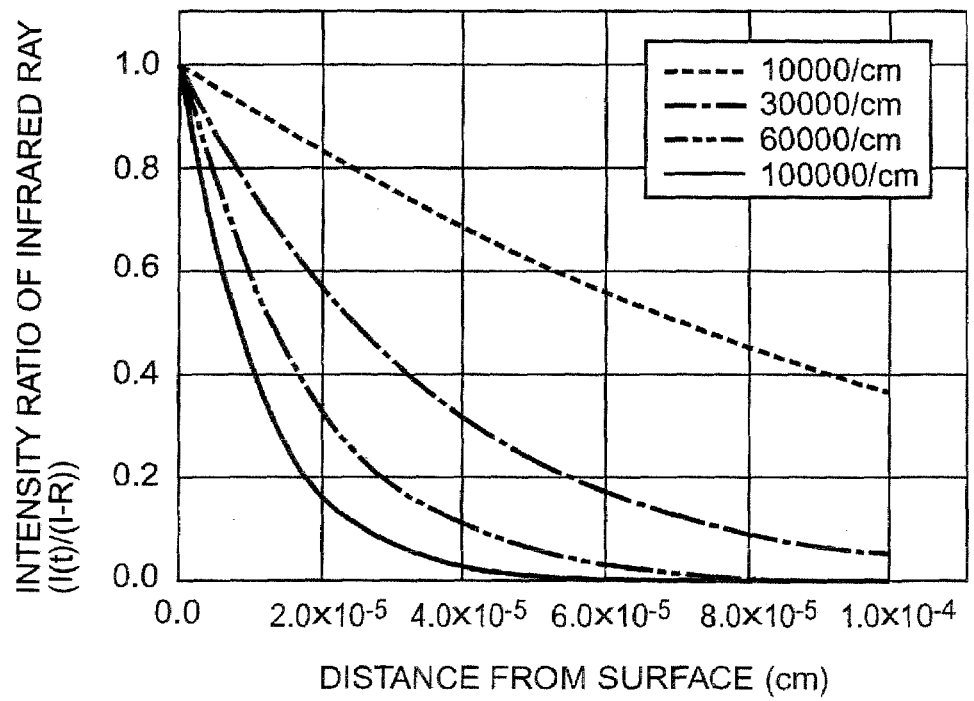
FIG. 5 is a graph showing the relations between t and $I(t)/(I-R)$.

FIG. 5 shows the relations between t and $I(t)/(I-R)(=\exp(-\alpha t))$ when α is set as 10000/cm, 30000/cm, 60000/cm, and 100000/cm.

If α=100000/cm and t=about 230 nm, then the strength of the infrared ray transmitting the absorbing film 32 becomes less than 10%. That is, if αt>about 2.3, then the strength of the infrared ray transmitting the absorbing film 32 becomes less than 10%, and the infrared ray that is further reflected by the undercoat or the reflection film 31 and again transmits the absorbing film 32 to return to the inside of the heat insulating container 30 becomes less than 1%. Consequently, the film having a film thickness T that meets the condition that the αT is larger than about 2.3 is suitable for the absorbing film 32.

On the other hand, if α=100000/cm and t=25 nm, i.e. if αt=0.25, then the strength of the infrared ray transmitting the absorbing film 32 becomes about 78%, and the infrared ray that is further reflected by the undercoat or the reflection film 31 and again transmits the absorbing film 32 to return to the inside of the heat insulating container 30 becomes about 61%. Consequently, the film like that is not suitable for the absorbing film 32.

[3] Examination of Radiation Wavelength

Figure 6:
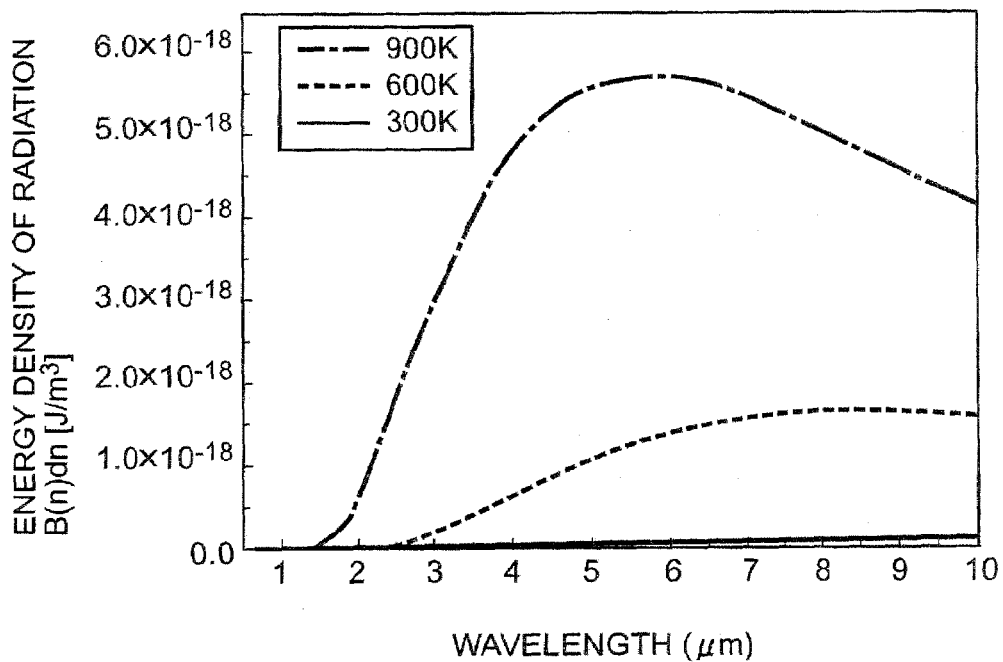
FIG. 6 is a graph showing the relations between the wavelengths and energy densities of radiation of black body radiation.

Next, the wavelength of the radiation radiated from the reaction device 10 will be examined. FIG. 6 is a graph showing the relations between the wavelengths of black body radiation and the energy densities of the radiation at 300K (27° C.), 600K (327° C.), and 900K (627° C.). It can be known that the energy density of the radiation becomes higher at the wavelength of 2 μm or more (0.6 eV or less) at 600K, and the energy density of the radiation becomes higher at the wavelength of 1.24 μm or more (1 eV or less) at 900K. Accordingly, the heat dissipation acceleration portion 40 is required to have the reflectivity of the infrared rays of the wavelengths of 1.24 μm or more to be lower.

[4] Examination of Metal Materials and Semimetal Materials

Metal materials and semimetal materials generally have high reflectivity, but have absorption coefficients of $10^5$/cm or more at almost all wavelengths. Accordingly, the metal materials and the semimetal materials can be used as the candidates of the absorbing film 32 by setting their film thicknesses to be 230 nm. The reflectivity of the metal materials and the semimetal materials will be accordingly examined.

Figure 7:
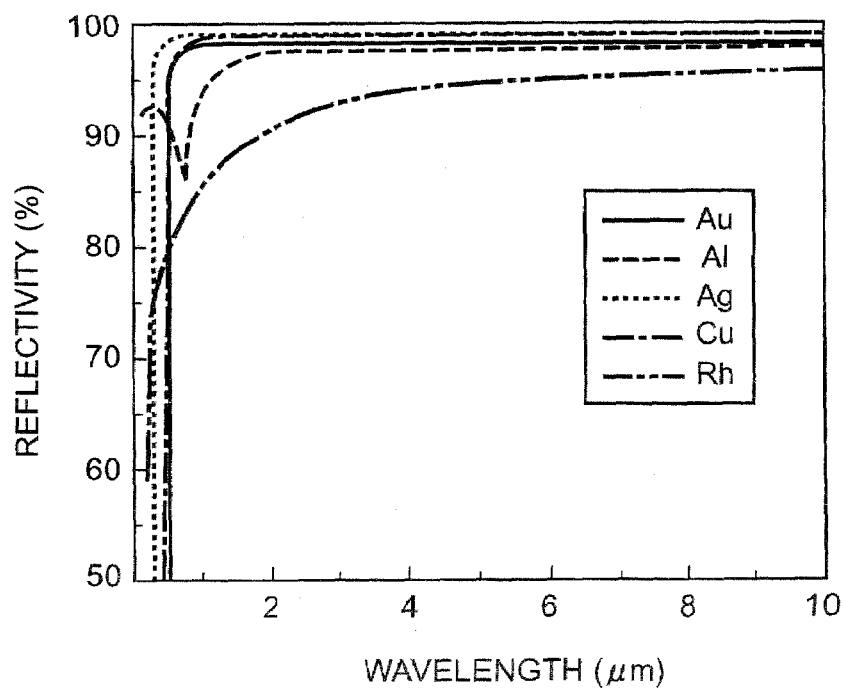
FIG. 7 is a graph showing the reflectivity to the wavelengths of Au, Al, Ag, Cu, and Rh.

FIG. 7 shows the reflectivity of Au, Al, Ag, Cu, and Rh to wavelengths. Among them, the reflectivity of Rh is relatively lower in the wavelength region of 1.24 μm or longer, and consequently Rh can be adopted as a candidate of the material of the absorbing film 32.

In addition, as the metals having relatively lower reflectivity in the wavelength of 1.24 μm, Fe (having the reflectivity of 75%), Co (having the reflectivity of 78%), Pt (having the reflectivity of 78%), Cr (having the reflectivity of 63%), and the like can be made to be the material of the absorbing film 32.

Moreover, among the materials of the semimetals graphite (layer carbon) can be mentioned as the material having low reflectivity. The reflectivity of the graphite is small to be 42% at the wavelength of 1.24 μm and 47% at the wavelength of 2 μm, and accordingly graphite can be used as the material of the absorbing film 32. Moreover, although a carbon material called as activated carbon has a bad crystalline characteristic and the layer structure thereof is also disordered, activated carbon has the possibility of being used as a candidate of the material of the absorbing film 32.

[5] Examination of Nonmetals

Many semiconductors have reflectivity within a range of from 10% to 20%, or less than that, in the wavelength region of 1.24 μm or longer, and consequently semiconductors seem to be the materials suitable as the absorbing film 32. But almost all semiconductors have extremely small absorption coefficients to be less than 1/cm.

However, amorphous semiconductors having dangling bonds have higher absorption coefficients, and consequently the amorphous semiconductors can be considered to be capable of being used as the material of the absorbing film 32. For example, amorphous silicon, which has many dangling bonds, has an absorption coefficient of 1000/cm or more, and consequently can be used as the material of the absorbing film 32.

Figure 8:
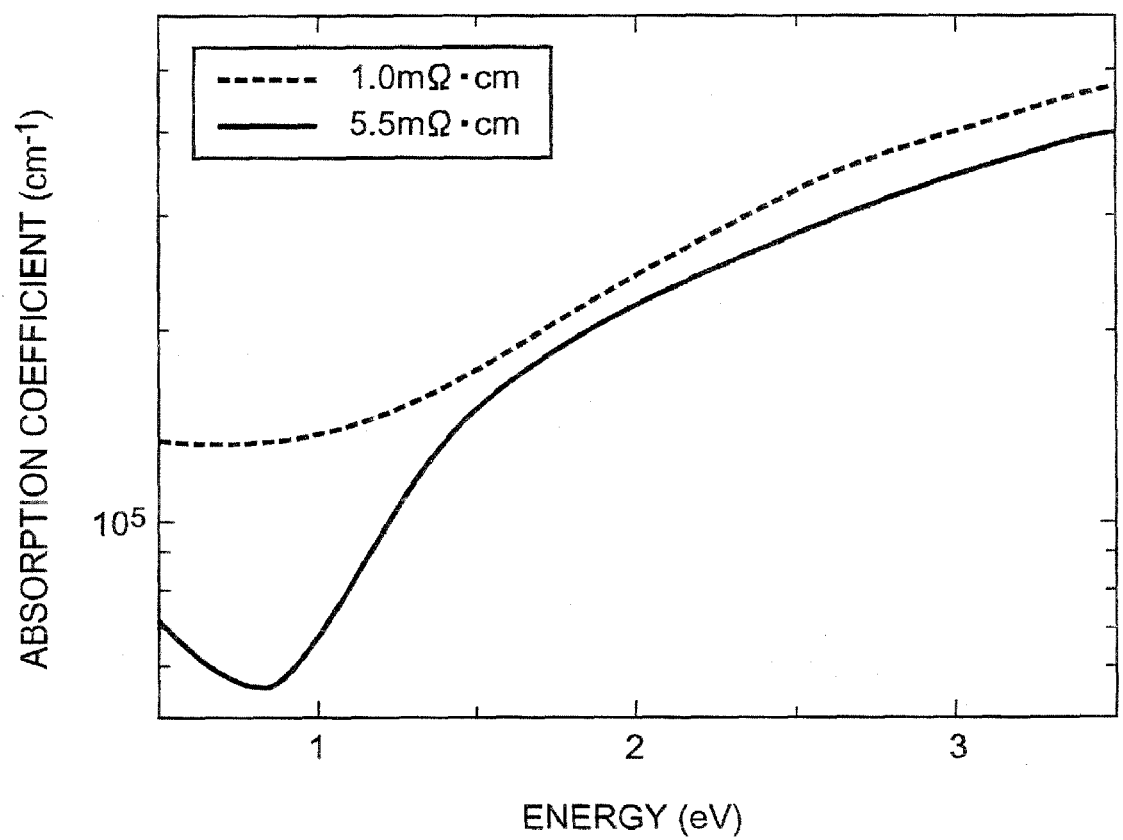
FIG. 8 is a graph showing the results of the measurements of absorption coefficients of Ta—Si—O—N films.

Moreover, there are Ta—Si—O—N films as the amorphous semiconductor materials more suitable for the absorbing film 32. FIG. 8 shows the results of measurements of the absorption coefficients (cm$^{-1}$) of the Ta—Si—O—N films having the resistivities of 1.0 mΩ·cm and 5.5 mΩ·cm for the radiation of 0.5-3.5 eV (wavelengths of about 2.48 μm to 350 nm). The films having the resistivity of 1.0 mΩ·cm have the absorption coefficients of 100000/cm or more within the measurement range, and the films can be used as the material of the absorbing film 32.

Moreover, the applicant of the present application found that the Ta—Si—O—N film having the compositions in which molar ratios are within the ranges of about 0.6<Si/Ta<about 1.0 and about 0.15<N/O<about 4.1 had the absorption coefficients of 100000/cm or more at the time when their resistivity were 2.5 mΩ·cm or less. Consequently, also the materials mentioned above can be used as the material of the absorbing film 32.

<Modification 1A>

Figure 9A:
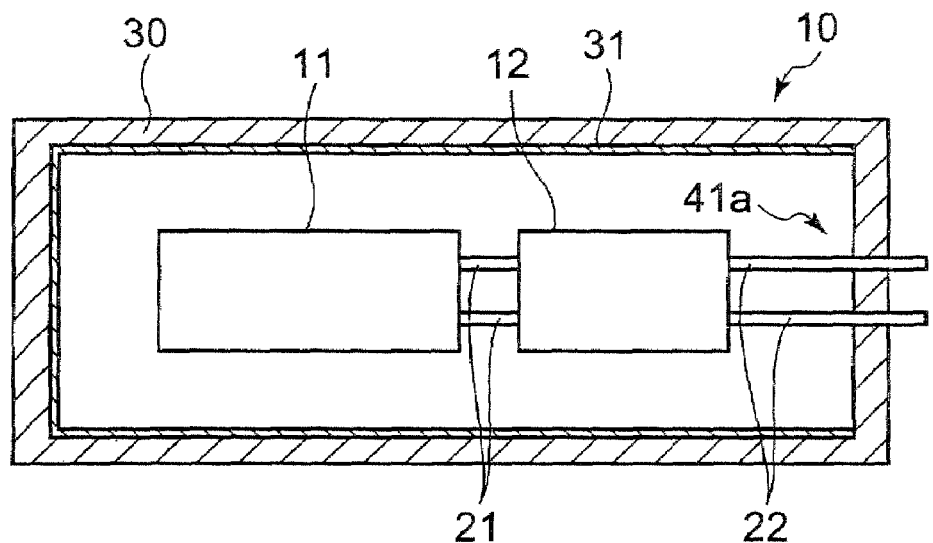
FIG. 9A is a sectional view showing a modification "modification 1A" of the reaction device 10 of the present invention.

Although the embodiments described above are provided with the heat dissipation acceleration portions 40 on the inner wall surfaces of the heat insulating containers 30 where the pipe 22 penetrates the heat insulating containers 30, for example as shown in FIG. 9A, the part of the inner wall surface of the heat insulating container 30 where the pipe 22 penetrates the heat insulating container 30 may not be covered by the reflection film 31, and the undercoat may be exposed to be used as a heat dissipation acceleration portion 41*a*. The adiabatic effect can be secured by the reflection film 31, and the infrared rays radiated from the reaction device 10 are absorbed by the heat dissipation acceleration portion 41*a* to be transmitted to the heat insulating container 30 as radiant heat. Thereby, the steep temperature changes near the part can be suppressed, and then the thermal stress can be reduced.

<Modification 1B>

Figure 9B:
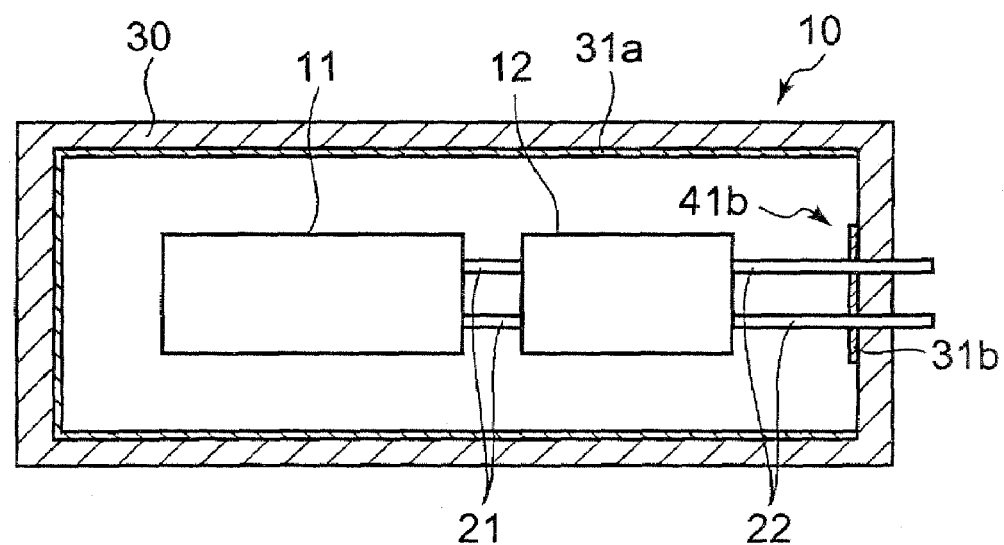
FIG. 9B is a sectional view showing another modification "modification 1B" of the reaction device 10 of the present invention.

Moreover, as shown in FIG. 9B, the reflection film 31*a* may be formed on the whole surface of the inner wall surface except for the surface where the pipe 22 penetrates the heat insulating container 30, and the reflection film 31*b* may be formed within the same plane of the inner wall surface where the pipe 22 penetrates the heat insulating container 30 in the neighborhood of the penetration portions of the pipe 22 to expose the undercoat at the positions distant from the penetration portions so that the portion of the exposed undercoat may be used as a heat dissipation acceleration portion 41*b*.

By providing the heat dissipation acceleration portion 41*b* in such a way, a heat quantity is conducted from the reaction device 10 to the heat insulating container 30 by the pipe 22, and the infrared rays radiated from the reaction device 10 is absorbed by the heat dissipation acceleration portion 41*b* formed on the wall at the position distant from the penetration portions of the pipe 22 to be transmitted to the heat insulating container 30 as radiant heat. Consequently, the temperature of the whole wall where the heat dissipation acceleration portion 41*b* is provided can be more uniformly raised, and steep temperature changes can be suppressed. Hence, the thermal stress can be reduced.

<Modification 2A>

Figure 10A:
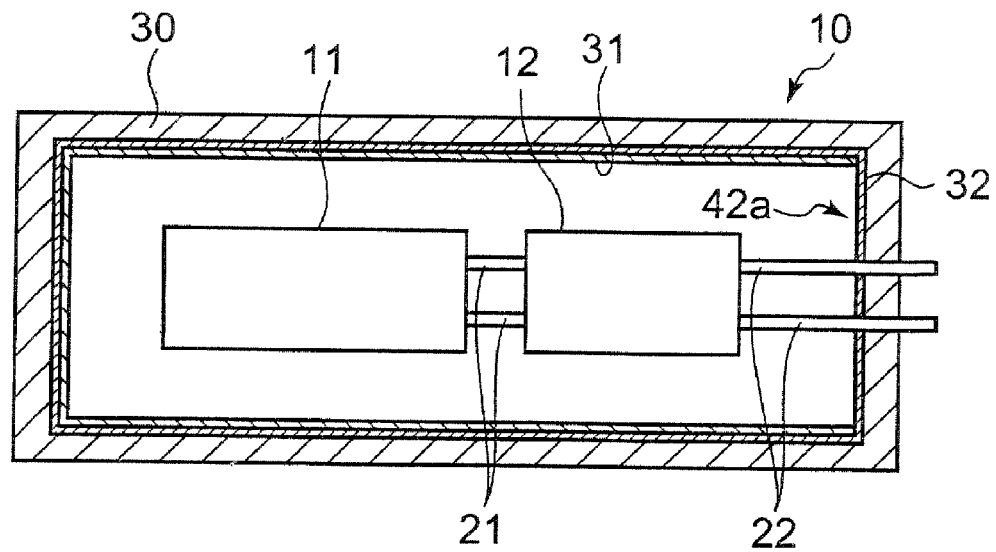
FIG. 10A is a sectional view showing a further modification "modification 2A" of the reaction device 10 of the present invention.

Moreover, as shown in FIG. 10A, the absorbing film 32 may be formed on the whole inner wall surface of the heat insulating container 30, and the reflection film 31 may be formed on the absorbing film 32 except for the same plane of the inner wall surface where the pipe 22 penetrates the heat insulating container 30 so that the part of the inner wall surface where the absorbing film 32 is exposed may be used as a heat dissipation acceleration portion 42*a*. The adiabatic effect can be secured by the reflection film 31, and the infrared rays radiated from the reaction device 10 are absorbed by the heat dissipation acceleration portion 42*a* to be transmitted to the heat insulating container 30 as radiant heat. Thereby, the steep temperature changes near the part of the wall where the heat dissipation acceleration portion 42*a* is formed can be suppressed, and then the thermal stress can be reduced.

<Modification 2B>

Figure 10B:
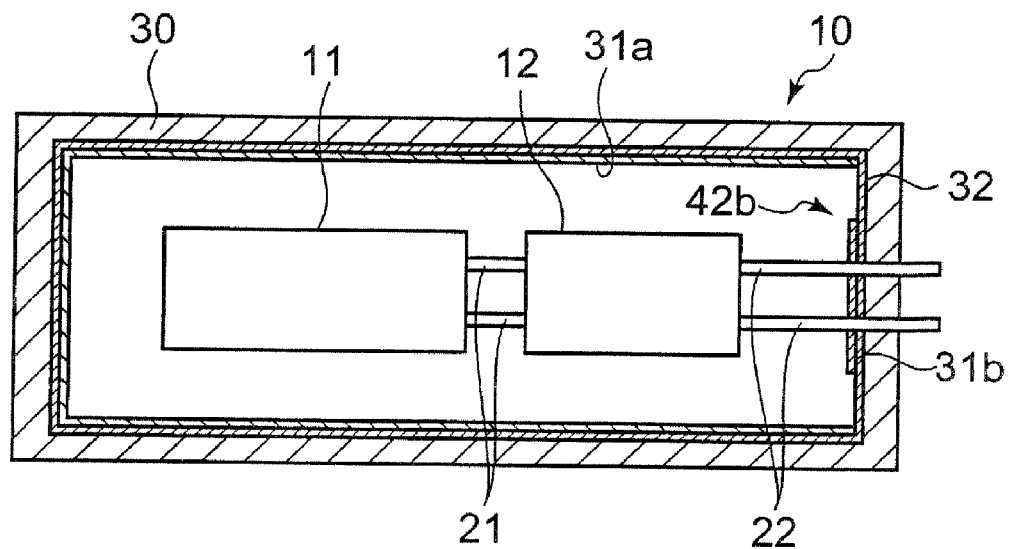
FIG. 10B is a sectional view showing a still further modification "modification 2B" of the reaction device 10 of the present invention.

Moreover, as shown in FIG. 10B, the absorbing film 32 may be formed on the whole surface of the inner wall surface of the heat insulating container 30, and the reflection film 31*a* may be formed next on the whole surface of the inner wall surface where the pipe 22 does not penetrate the heat insulating container 30. Then, the reflection film 31*b* may be formed on the same plane of the inner wall surface where the pipe 22 penetrates the heat insulating container 30 in the neighborhood of the penetration portions of the pipe 22 to form a portion where the absorbing film 32 is exposed at the position distant from the penetration portions of the pipe 22 by a little so that the portion where the absorbing film 32 is exposed may be used as a heat dissipation acceleration portion 42*b*. By providing the heat dissipation acceleration portion 42*b* in such a way, a heat quantity is conducted from the reaction device 10 to the heat insulating container 30 by the pipe 22, and the infrared rays radiated from the reaction device 10 is absorbed by the heat dissipation acceleration portion 42*b* formed on the wall at the position distant by a little from the penetration portions of the pipe 22 to be transmitted to the heat insulating container 30 as radiant heat. Consequently, the temperature of the whole wall where the heat dissipation acceleration portion 42*b* is provided can be more uniformly raised, and steep temperature changes can be suppressed. Hence, the thermal stress can be reduced.

<Modification 3A>

Figure 11A:
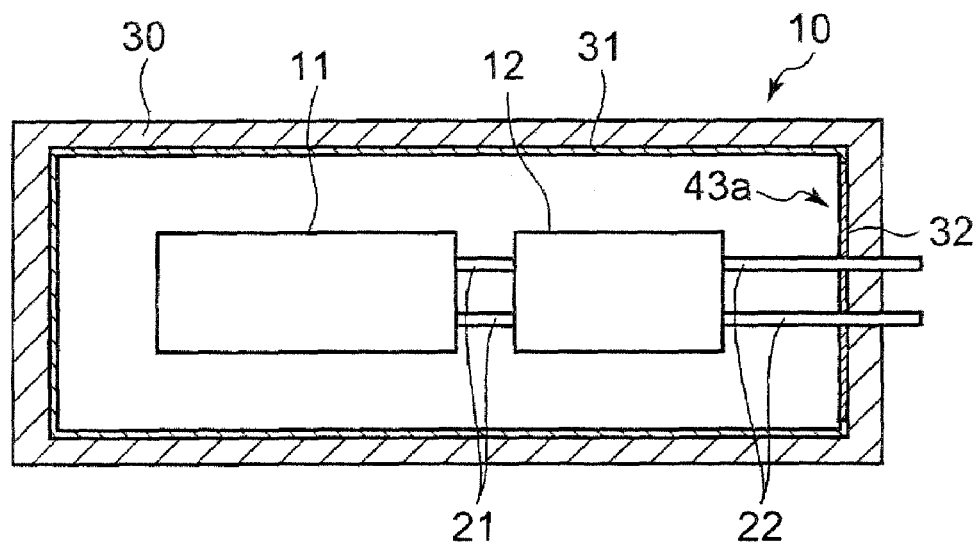
FIG. 11A is a sectional view showing a still further modification "modification 3A" of the reaction device 10 of the present invention.

Moreover, as shown in FIG. 11A, the absorbing film 32 may be formed on the same plane of the inner wall surface of the heat insulating container 30 where the pipe 22 penetrates the heat insulating container 30, and the reflection film 31 may be formed on the other parts of the inner wall surface of the heat insulating container 30 so that the part of the absorbing film 32 may be used as a heat dissipation acceleration portion 43a. In this case, the periphery of the absorbing film 32 and the reflection film 31 may be overlapped on each other. The adiabatic effect can be secured by the reflection film 31, and the infrared rays radiated from the reaction device 10 are absorbed by the heat dissipation acceleration portion 43a to be transmitted to the heat insulating container 30 as radiant heat. Thereby, the temperature of the wall near the part where the heat dissipation acceleration portion 43a is formed can be gently raised, and the steep temperature changes can be suppressed to reduce the thermal stress.

<Modification 3B>

Figure 11B:
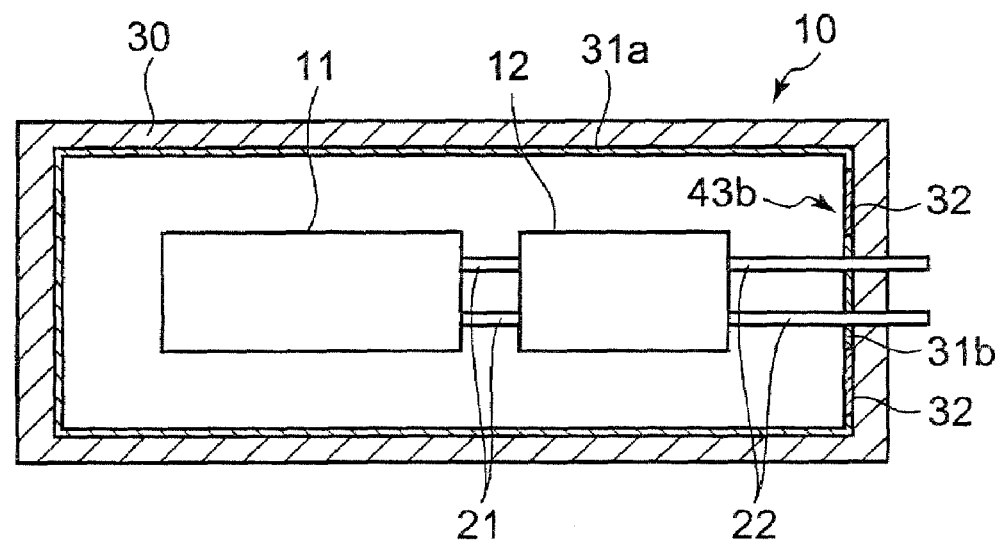
FIG. 11B is a sectional view showing a still further modification "modification 3B" of the reaction device 10 of the present invention.

Moreover, as shown in FIG. 11B, the reflection film 31a may be formed on the whole surface of the inner wall surface where the pipe 22 does not penetrate the heat insulating container 30, and the reflection film 31b may be formed on the same plane of the inner wall surface where the pipe 22 penetrates the heat insulating container 30 in the neighborhood of the penetration portions of the pipe 22. Furthermore, the absorbing film 32 may be formed at the position distant from the penetration portions of the pipe 22 by a little so that the portion of the absorbing film 32 may be used as a heat dissipation acceleration portion 43b. By providing the heat dissipation acceleration portion 43b in such a way, a heat quantity is conducted from the reaction device 10 to the heat insulating container 30 by the pipe 22, and the infrared rays radiated from the reaction device 10 is absorbed by the heat dissipation acceleration portion 43b formed on the wall at the position distant by a little from the penetration portions of the pipe 22 to be transmitted to the heat insulating container 30 as radiant heat. Consequently, the temperature of the whole wall where the heat dissipation acceleration portion 43b is provided can be more uniformly raised, and steep temperature changes can be suppressed. Hence, the thermal stress can be reduced.

<Modification 4A>

Figure 12:
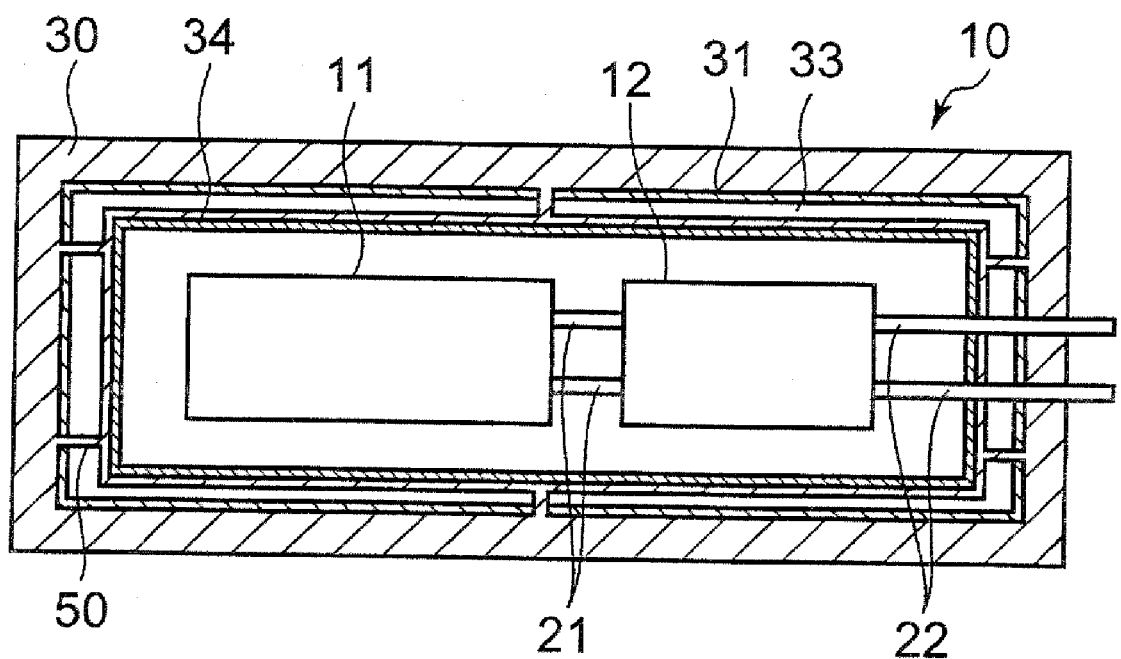
FIG. 12 is a sectional view showing a comparative example corresponding to modifications 4A and 4B of the reaction device 10 of the present invention.

Moreover, when the reaction temperature of the reaction device 10 exceeds 600° C., the increase of the energy density of radiation becomes remarkable (see FIG. 3). Consequently, one layer of the reflection film 31 becomes insufficient, and it becomes necessary to form the reflection film 31 to be two layers. That is, as shown in FIG. 12, it is necessary that a vacant space 33 is formed in the inside of the outer reflection film 31 to form a second reflection film 34. The vacant space 33 is formed by, for example, supporting members 50 made of the same material as that of the heat insulating container 30. By forming the vacant space 33, the heat conduction from the second reflection film 34 to the first reflection film 31 can be prevented to make it possible to heighten the adiabatic efficiency thereof.

Figure 13A:
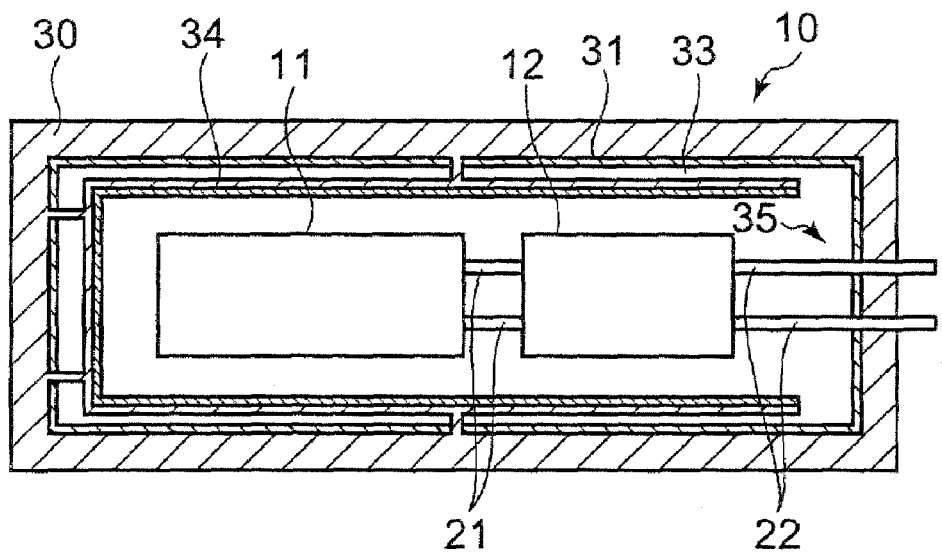
FIG. 13A is a sectional view showing the still further modification "modification 4A" of the reaction device 10 of the present invention.

In this case, as shown in FIG. 13A, a heat dissipation window 35 (heat dissipation acceleration portion) may be formed on the side of the second reflection film 34 where the pipe 22 is provided. By the two layers of the reflection films 31 and 34, radiation can be prevented, while it becomes possible to raise the temperature of the part near the wall of the inner wall surface where the pipe 22 does not penetrate the heat insulating container 30 by the provision of the heat dissipation window 35, and to suppress steep temperature changes to reduce the thermal stress.

<Modification 4B>

Figure 13B:
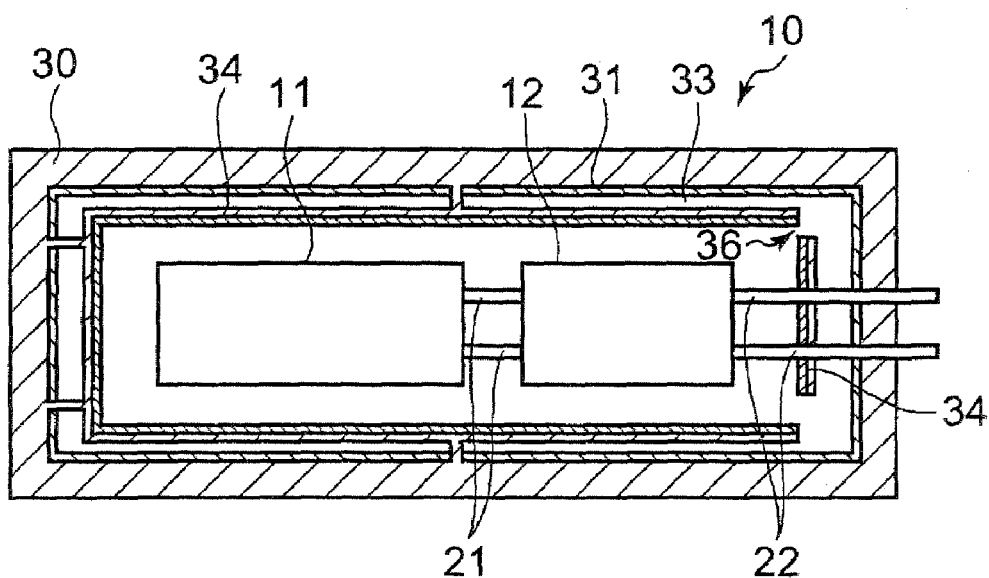
FIG. 13B is a sectional view showing the still further modification "modification 4B" of the reaction device 10 of the present invention.

Moreover, as shown in FIG. 13B, a heat dissipation window 36 (heat dissipation acceleration portion) may be formed at a position distant from the circumference of the pipe 22 on the side of the second reflection film 34 where the pipe 22 is provided. By the two layers of the reflection films 31 and 34 in the neighborhood of the penetration portion where the pipe 22 penetrates the heat insulating container 30, radiation can be prevented, while a heat quantity is conducted from the reaction device 10 to the heat insulating container 30 by the pipe 22 and the heat quantity is also conveyed to the heat insulating container 30 as radiant heat radiated from the reaction device 10 through the heat dissipation window 36 by forming the heat dissipation window 36. Consequently, it becomes possible to raise the temperature of the whole wall where the pipe 22 penetrates the heat insulating container 30 uniformly, and to suppress steep temperature changes to reduce the thermal stress.

[Schematic Configuration of Fuel Cell Device]

Figure 14:
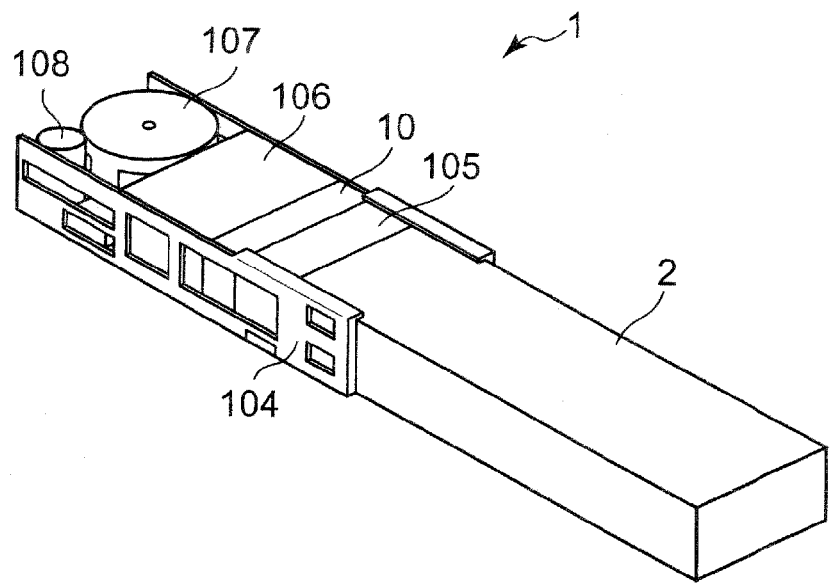
FIG. 14 is a perspective view showing an example of the mode of the fuel cell device 1 according to the embodiment of the present invention.

Next, the schematic configuration of the fuel cell device 1 will be described. FIG. 14 is a perspective view showing an example of the fuel cell device 1. As shown in FIG. 14, the reaction device 10 described above can be used by being incorporated into the fuel cell device 1. The fuel cell device 1 is composed of, for example, a frame 104; the fuel container 2 detachably attachable to the frame 104; a flow rate control unit 105 including a flow path, a pump, a flow rate sensor, valve, and the like; the not shown vaporizer 3; the reaction device 10; the not shown fuel cell 4; an electric power generation module 106 including a humidifier humidifying the fuel cell 4, a collecting-container collecting the by-products produced by the fuel cell 4, and the like; an air pump 107 supplying air (oxygen) to the reaction device 10 and the electric power generation module 106; and a power source unit 108 including an external interface for electrically connecting the fuel cell device 1 to an external device driven by the output of a secondary battery, DC-DC converter, or the fuel cell device 1. When a gaseous mixture of the water and the liquid fuel in the fuel container 2 is supplied to the reaction device 10 via the vaporizer 3 by the flow rate control unit 105, a hydrogen gas is produced as described above, and the hydrogen gas is supplied to the fuel cell 4 of the electric power generation module 106. Thereby, generated electricity is stored in the secondary battery of the power source unit 108.

[Electronic Apparatus]

Figure 15:
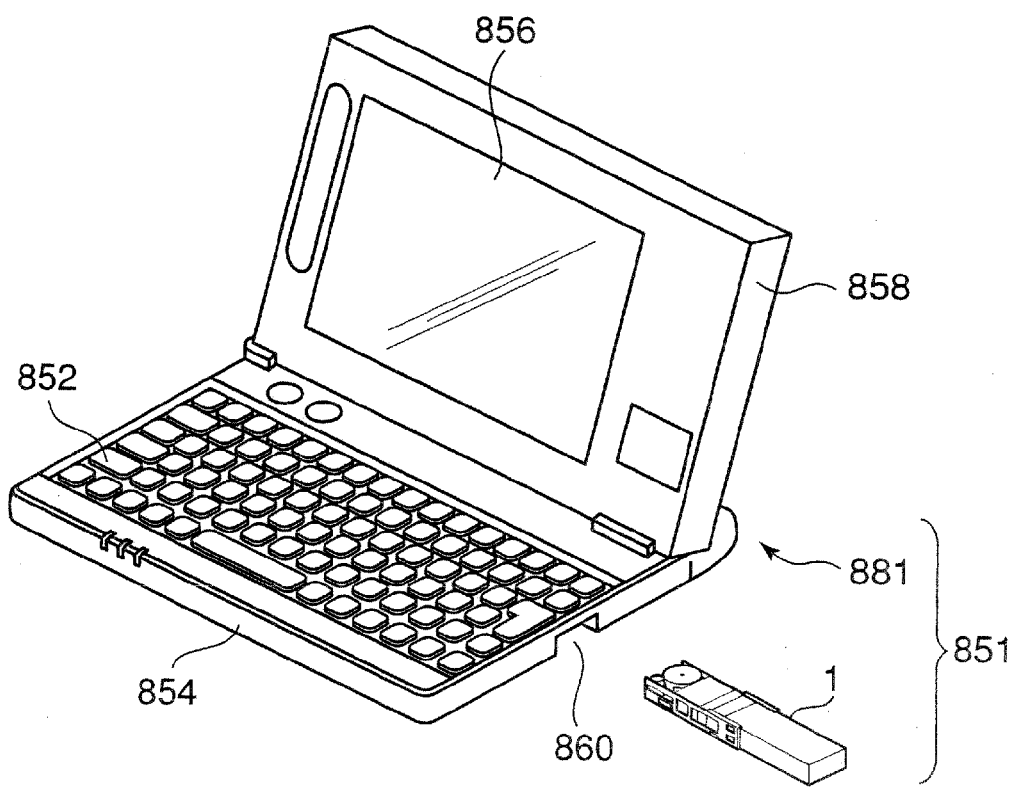
FIG. 15 is a perspective view showing an example of an electronic apparatus 851 using the fuel cell device 1 as the power source thereof.

FIG. 15 is a perspective view showing an example of an electronic apparatus 851 using the fuel cell device 1 as the power source thereof. As shown in FIG. 15, the electronic apparatus 851 is a portable electronic apparatus such as a notebook-size personal computer. The electronic apparatus 851 has an arithmetic processing circuit composed of a CPU, a RAM, a ROM, and the other electronic parts therein, and is provided with a lower housing 854 including a keyboard 852 and an upper housing 858 including a liquid display 856. The lower housing 854 and the upper housing 858 are coupled with each other with a hinge, and are configured to be capable of being folded in the state in which the upper housing 858 is put upon the lower housing 854 so that the liquid display 856 is opposed to the keyboard 852. A mounting portion 860 for mounting the fuel cell device 1 is formed from the right side surface of the lower housing 854 to the bottom surface thereof. When the fuel cell device 1 is mounted into the mounting portion 860, the electronic apparatus 851 is operated by the electricity of the fuel cell device 1.

The parts of the electronic apparatus 851 other than the fuel cell device 1 correspond to the electric device main body 881 here.

Alternately, the frame 104, flow rate control unit 105, vaporizer 3, reaction device 10, fuel cell 4, electric power generation module 106, air pump 107 and power source unit 108 of the fuel cell device 1 may be built in the electronic device main body 881, and when the fuel container 2 is attached to the frame 104, the fuel and water in the fuel container 2 may be supplied to the flow rate control unit by a pump.

The entire disclosure of Japanese Patent Application No. 2006-175152 filed on Jun. 26, 2006 including the specification, the claims, the attached drawings, and the abstract is incorporated herein by reference.

Although various typical embodiments have been shown and described, the present invention is not limited to those embodiments, and the scope of the present invention is limited only by the following claims.

What is claimed is:

1. A reaction device, comprising:
a reactor;
a heat insulating container housing the reactor;
a pipe for flowing in reactants from outside of the heat insulating container; and
a pipe for flowing out products to the outside of the heat insulating container,
wherein:
the pipes penetrate a wall of the heat insulating container to connect the reactor to the outside of the heat insulating container;
an inner wall surface of the heat insulating container includes at least two regions having respective different infrared absorptivities; and
the region of the inner wall surface of higher infrared absorptivity and a portion of the wall penetrated by the pipes are located on a same plane of the wall, and are separated from each other.

2. The reaction device according to claim 1, wherein the region of the inner wall surface of lower infrared absorptivity is provided with an infrared reflective film, so as to have lower infrared absorptivity than the region of the inner wall surface of higher infrared absorptivity.

3. The reaction device according to claim 1, wherein the region of the inner wall surface of higher infrared absorptivity is provided with an infrared ray absorbing film, so as to have higher infrared absorptivity than the region of the inner wall surface of lower infrared absorptivity.

4. The reaction device according to claim 3, wherein a product of an absorption coefficient and a film thickness of the infrared ray absorbing film is 2.3 or more.

5. The reaction device according to claim 3, wherein the infrared ray absorbing film consists essentially of one of C, Fe, Co, Pt, and Cr.

6. The reaction device according to claim 3, wherein the infrared ray absorbing film consists essentially of Ta—Si—O—N amorphous semiconductor, and has an absorption coefficient of 100,000/cm or more.

7. The reaction device according to claim 6, wherein the Ta—Si—O—N amorphous semiconductor has molar ratios within ranges of $0.6<Si/Ta<1.0$ and $0.15<N/O<4.1$.

8. The reaction device according to claim 1, wherein the reactor includes a reformer to produce hydrogen.

9. A fuel cell device, comprising:
the reaction device according to claim 1; and
a fuel cell to generate electric power from a reformed gas produced by the reactor of the reaction device by an electrochemical reaction.

10. An electronic apparatus, comprising:
the reaction device according to claim 1;
a fuel cell to generate electric power from a reformed gas produced by the reactor of the reaction device by an electrochemical reaction; and
an electronic apparatus main body which operates by the electric power generated by the fuel cell.

* * * * *